United States Patent
Lee et al.

(10) Patent No.: US 9,778,811 B2
(45) Date of Patent: Oct. 3, 2017

(54) MOBILE TERMINAL AND METHOD OF CONTROLLING THE SAME TERMINAL

(71) Applicant: LG ELECTRONICS INC., Seoul (KR)

(72) Inventors: Hweejea Lee, Seoul (KR); Jaesung Hwang, Seoul (KR); Kwanlock Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 424 days.

(21) Appl. No.: 14/334,415

(22) Filed: Jul. 17, 2014

(65) Prior Publication Data

US 2015/0128037 A1    May 7, 2015

(30) Foreign Application Priority Data

Nov. 5, 2013  (KR) .................. 10-2013-0133683

(51) Int. Cl.
G06F 3/00 (2006.01)
G06F 3/0481 (2013.01)
G06F 17/28 (2006.01)
G06F 9/44 (2006.01)
G06F 3/01 (2006.01)

(52) U.S. Cl.
CPC .......... G06F 3/0481 (2013.01); G06F 9/4448 (2013.01); G06F 17/289 (2013.01); H04M 2250/22 (2013.01); H04M 2250/58 (2013.01)

(58) Field of Classification Search
CPC .. G06F 17/289; G06F 17/241; G06F 17/2836; G06F 17/2854
See application file for complete search history.

(56) References Cited

U.S. PATENT DOCUMENTS

| | | | | |
|---|---|---|---|---|
| 5,978,754 A | * | 11/1999 | Kumano | G06F 17/289 704/3 |
| 8,761,513 B1 | * | 6/2014 | Rogowski | G06F 17/2854 382/135 |
| 2002/0079143 A1 | * | 6/2002 | Silverstein | G06F 1/1626 178/18.01 |
| 2008/0300859 A1 | * | 12/2008 | Chen | G06F 9/543 704/7 |

(Continued)

FOREIGN PATENT DOCUMENTS

EP   1 156 414 A2   11/2001

OTHER PUBLICATIONS

European Search Report dated Sep. 11, 2015 issued in Application No. 14181919.3.

(Continued)

Primary Examiner — Nicholas Augustine
(74) Attorney, Agent, or Firm — KED & Associates LLP

(57) ABSTRACT

Provided is a mobile terminal including: a display unit on which screen information is output; a translation function unit that translates a translation-source information portion of the screen information that is output to the display unit; and a controller that outputs translation-target information into which the translation-source information portion is translated using the translation function unit, on a translation window, in which in a state where the screen information is output on the display unit, the translation window is positioned in one region of the display unit.

20 Claims, 20 Drawing Sheets (a)

(b)

(56) References Cited

U.S. PATENT DOCUMENTS

| | | | |
|---|---|---|---|
| 2009/0282037 A1* | 11/2009 | Choi | G06F 17/2735 |
| 2010/0030549 A1 | 2/2010 | Lee et al. | |
| 2011/0090253 A1* | 4/2011 | Good | G06F 17/289 |
| | | | 345/633 |
| 2012/0130704 A1 | 5/2012 | Lee et al. | |
| 2012/0166174 A1 | 6/2012 | Lipetskaia | |
| 2012/0330646 A1 | 12/2012 | Andrade et al. | |
| 2014/0056525 A1* | 2/2014 | Masuko | G06F 3/04842 |
| | | | 382/190 |
| 2014/0222413 A1* | 8/2014 | Rossmann | G06F 17/289 |
| | | | 704/3 |
| 2014/0297256 A1* | 10/2014 | Rogowski | G06F 17/289 |
| | | | 704/2 |
| 2016/0267074 A1* | 9/2016 | Nozue | G06F 17/289 |

OTHER PUBLICATIONS

European Search Report issued in Application No. 14181919.3 dated Apr. 24, 2015.

* cited by examiner

FIG. 4A
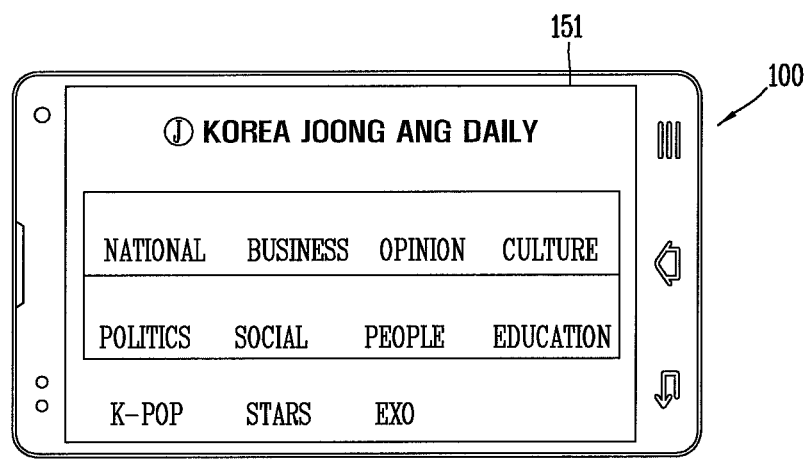
(a)
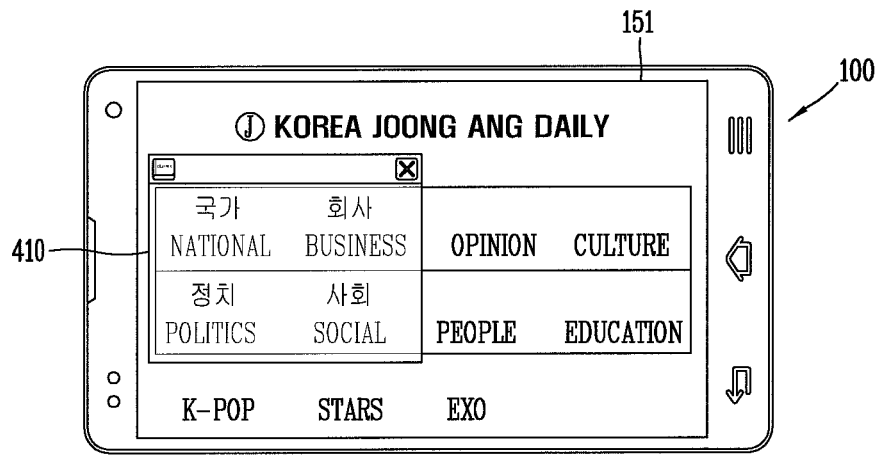
(b)

FIG. 4B
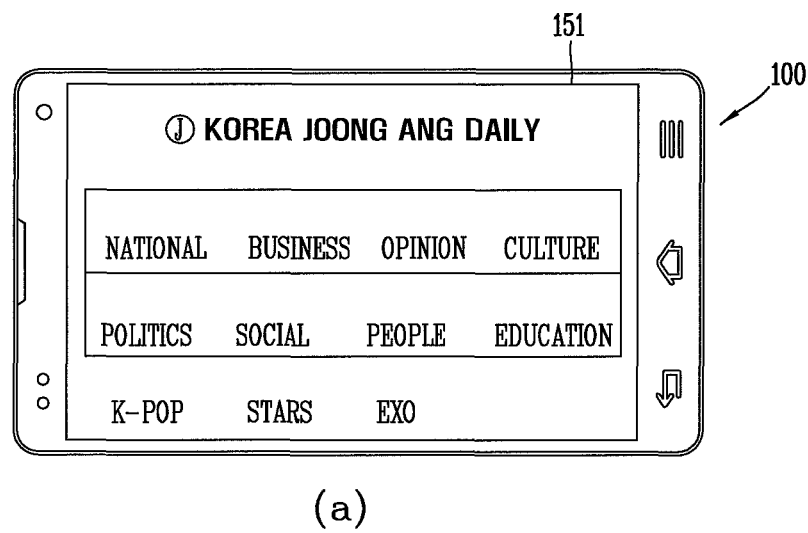
(a)
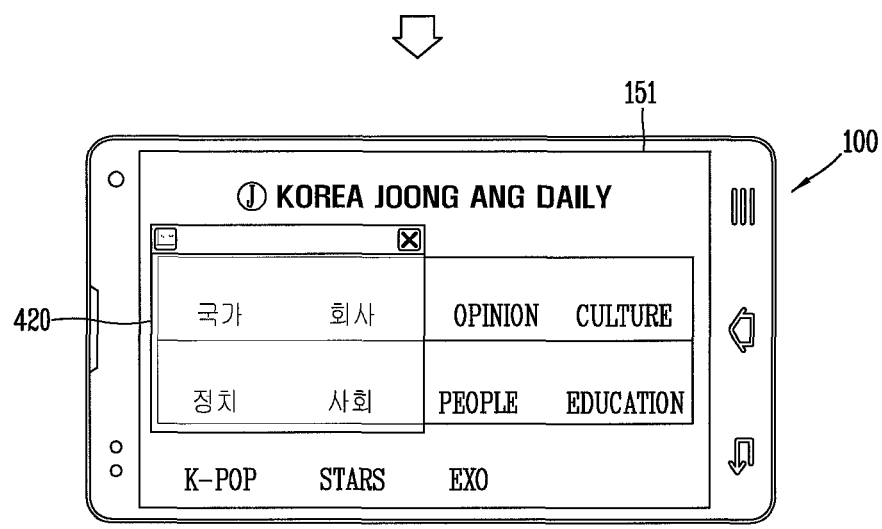
(b)

FIG. 4C
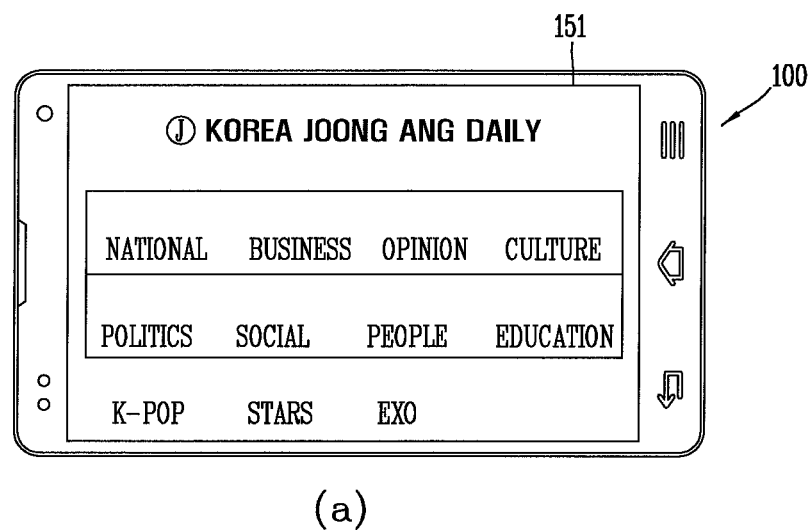
(a)
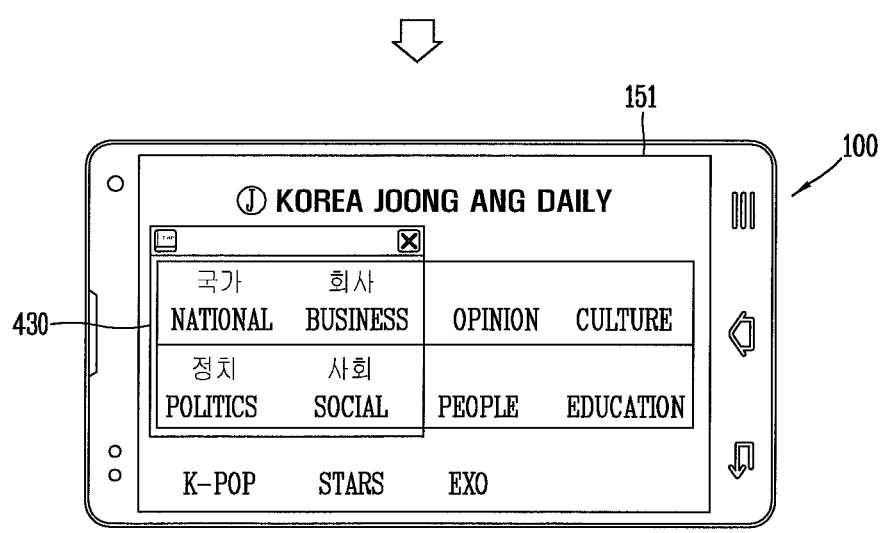
(b)

FIG. 5A
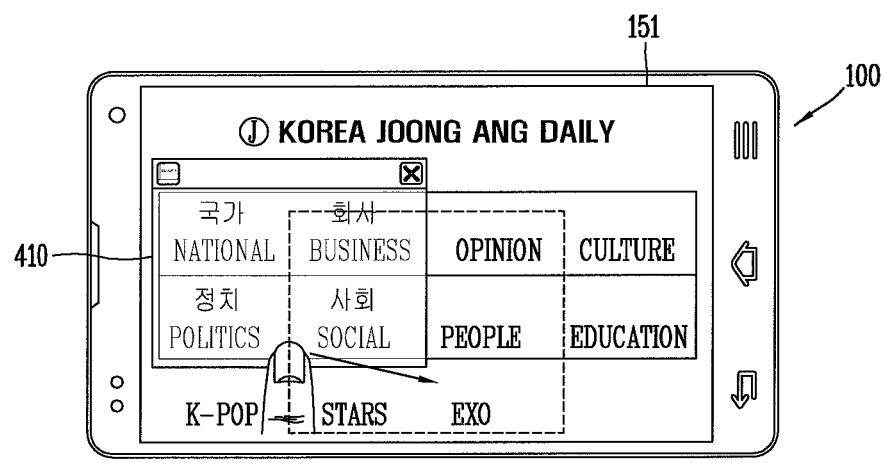
(a)
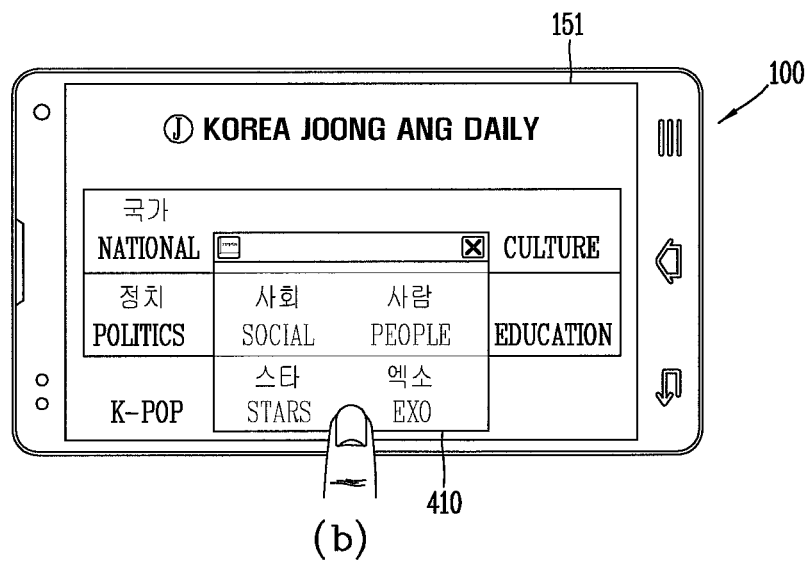
(b)

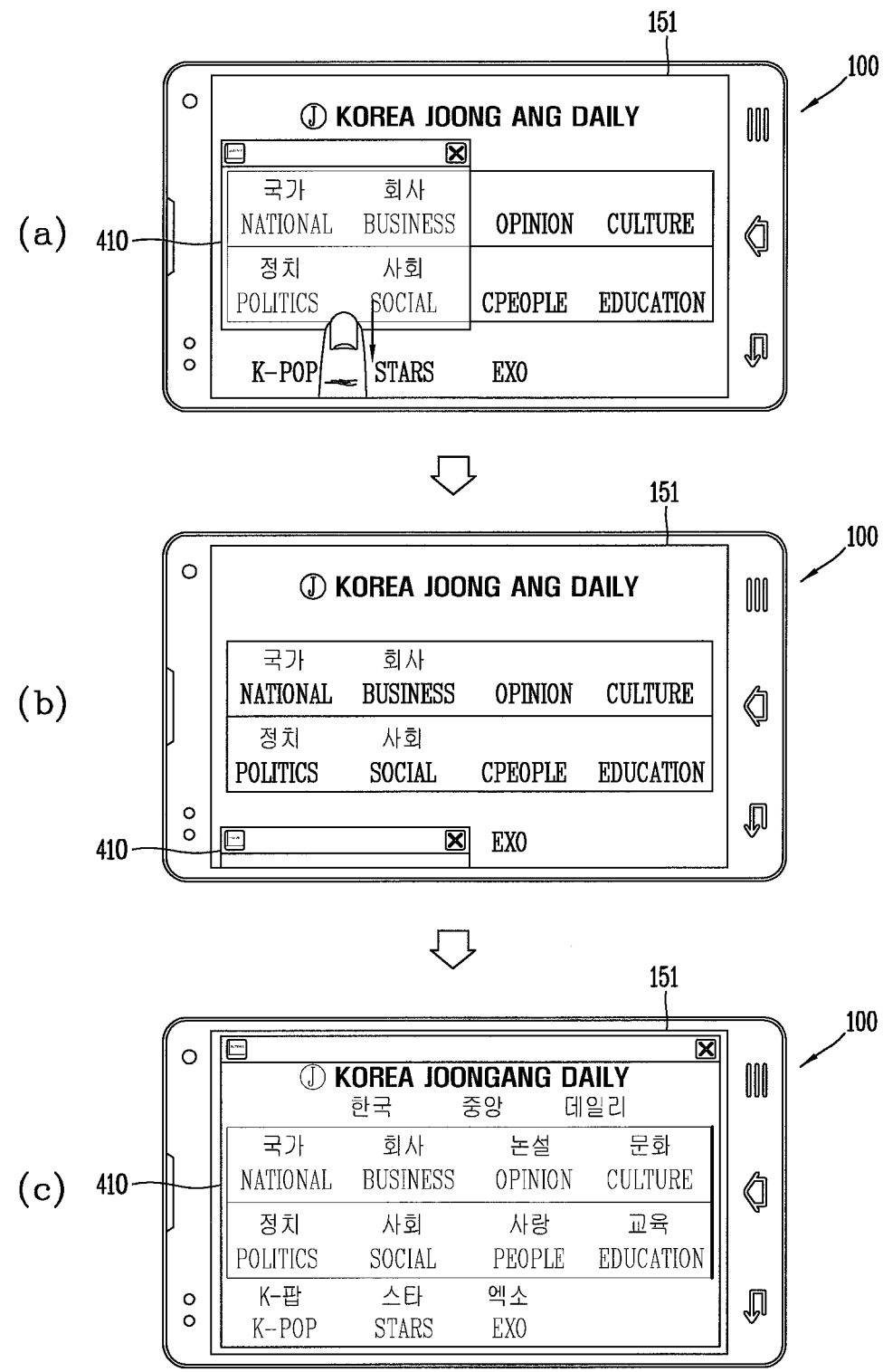

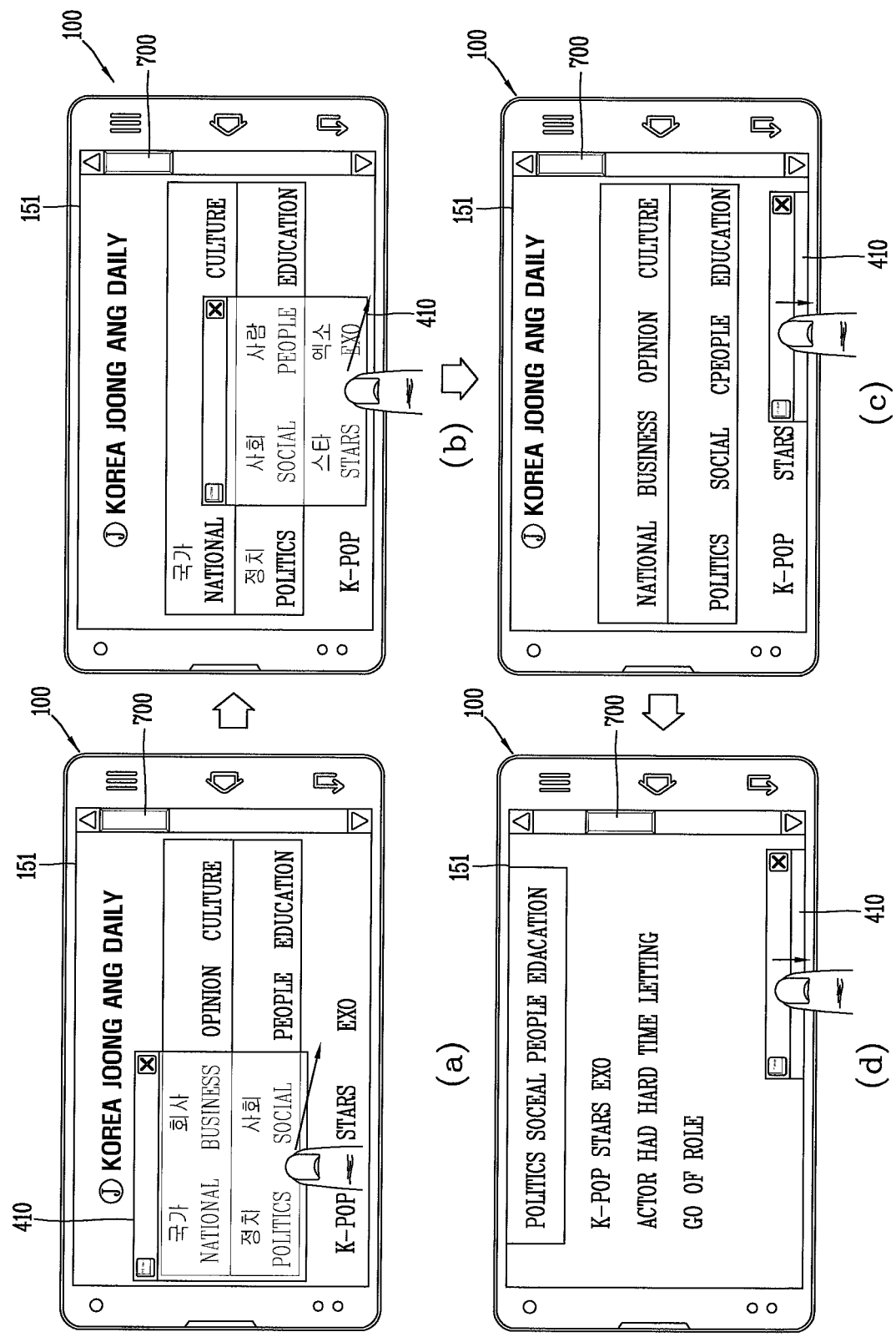

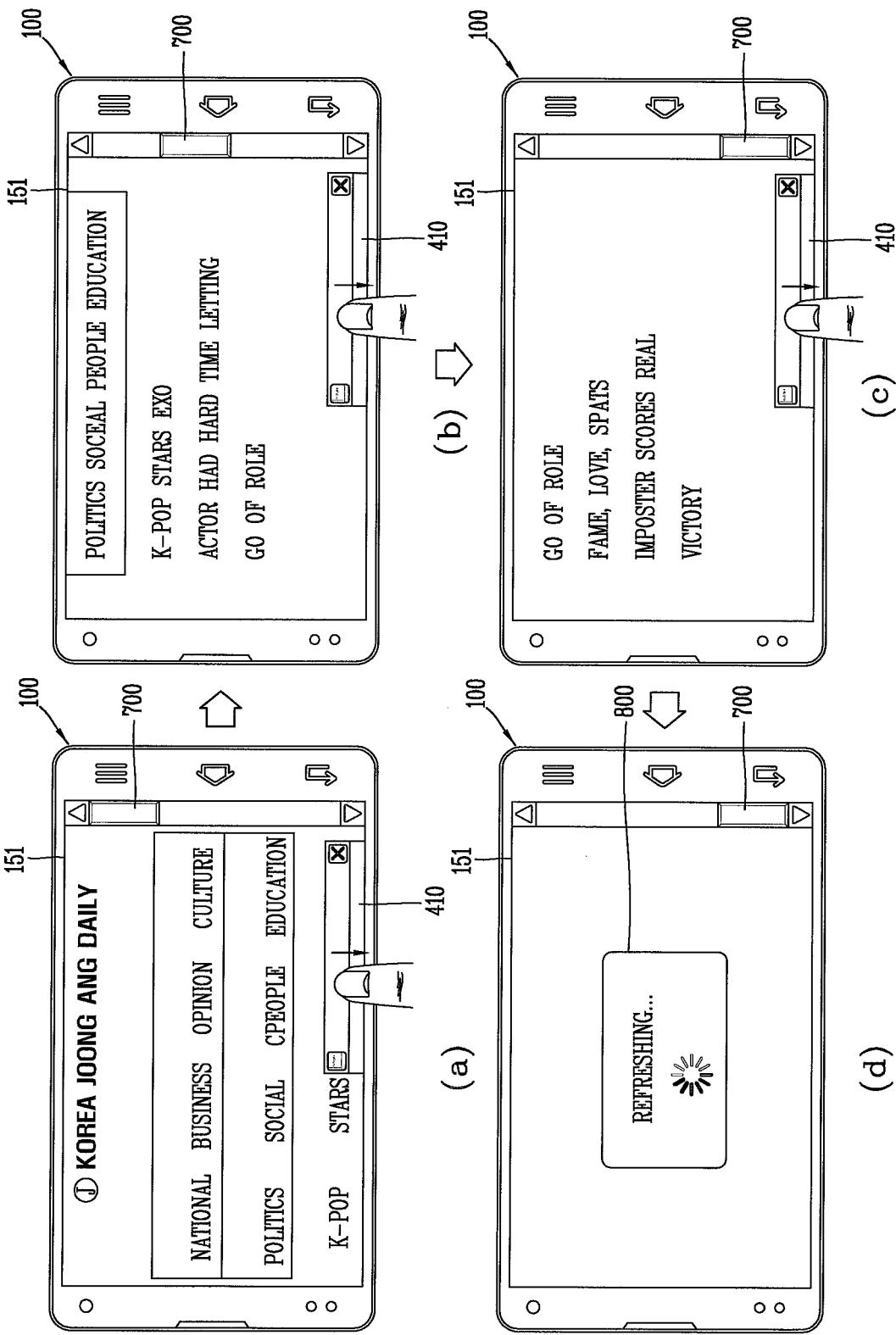

FIG. 9
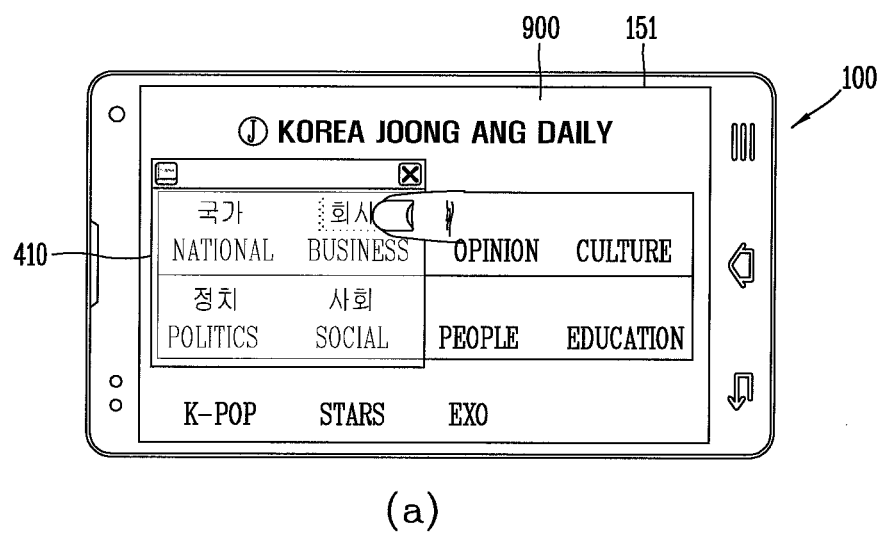
(a)
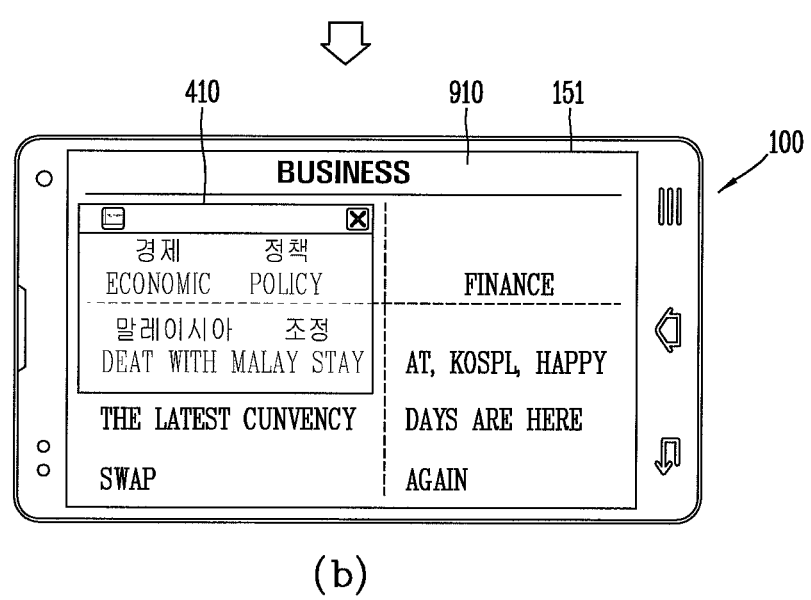
(b)

FIG. 12A
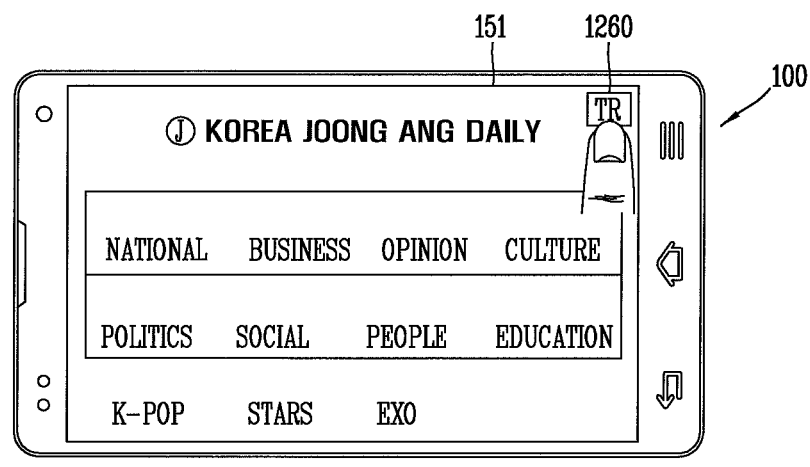
(a)
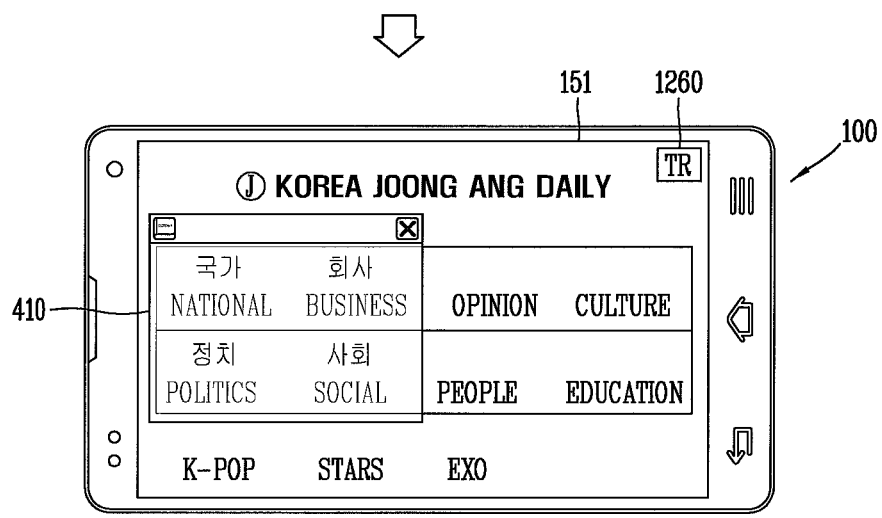
(b)

FIG. 12B
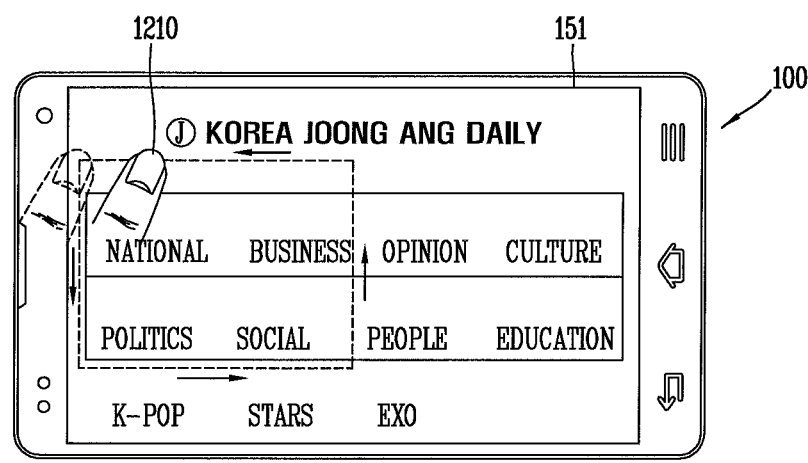
(a)
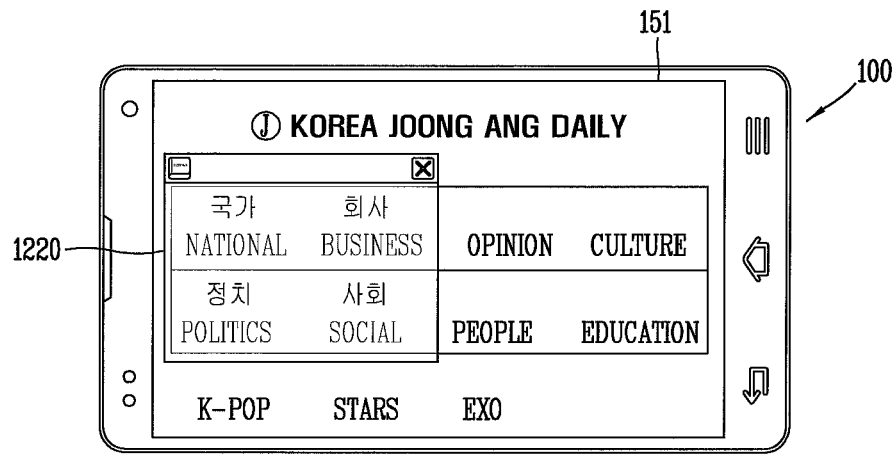
(b)

FIG. 13
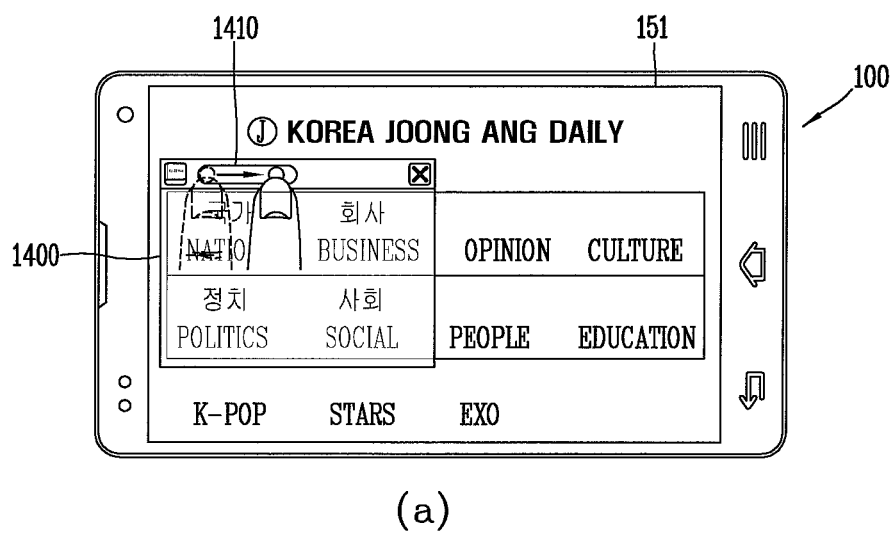
(a)
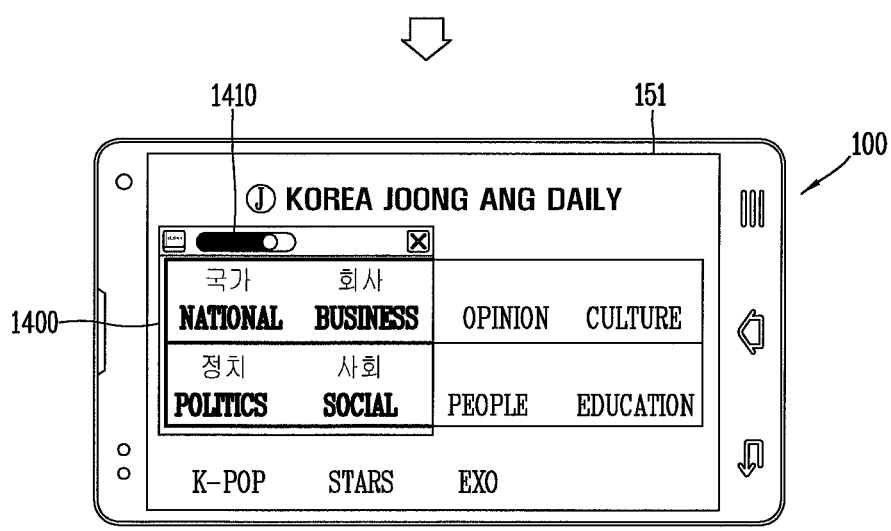
(b)

MOBILE TERMINAL AND METHOD OF CONTROLLING THE SAME TERMINAL

CROSS-REFERENCE TO RELATED APPLICATION(S)

Pursuant to 35 U.S.C. §119(a), this application claims the benefit of earlier filing date and right of priority to Korean Application No. 10-2013-0133683, filed on Nov. 5, 2013, the contents of which is incorporated by reference herein in its entirety.

BACKGROUND

1. Field

The present disclosure relates to a mobile terminal capable of translating various pieces of information and a method of controlling the mobile terminal.

2. Background

The increasing importance of the information management in the information age places particular emphasis on functions of an electronic device in which information is input and output and data is stored. The electronic device equipped with such functions is categorized into a portable electronic device and a stationary electronic device, such as an image display device.

In response to an increasing demand for diversified functions, the portable electronic device has been realized in the form of a multimedia player with multiple functions such as capturing a still image or a moving image of a photographic subject, reproducing a digital audio and video compression file, playing a game, receiving a broadcast and so on. In addition, the multiple functions are also applied to the stationary electronic device for user convenience.

In recent years, various attempts have been made to realize the multiple functions in hardware or in software. As one example, various user interface environments are provided in which translation-target information into which screen information being output to a display unit is translated is made available for a user in an easy, convenient manner.

For example, when a specific word in the screen information that is output to the display unit is selected, the specific word is automatically translated into the corresponding word in a desired language. In addition, voice information that is input is translated and then is output, as the translation-target information, to the display unit, using a voice recognition technology.

SUMMARY OF THE DISCLOSURE

Therefore, an object of the detailed description is to provide a method of outputting translation-target information into which screen information being output to a display unit is translated.

Another object of the detailed description is to provide a method of setting translation-source information portion of screen information being output to a display unit using a translation window to which to output translation-target information into which the translation-source information portion is translated.

A further object of the detailed description is to provide a method of controlling screen information that is output to a display unit using translation-target information into which translation-source information portion of the screen information is translated, which is output to a translation window.

To achieve these and other advantages and in accordance with the purpose of this specification, as embodied and broadly described herein, there is provided a mobile terminal including: a display unit on which screen information is output; a translation function unit that translates a translation-source information portion of the screen information that is output to the display unit; and a controller that outputs translation-target information into which the translation-source information portion is translated using the translation function unit, on a translation window, in which a state where the screen information is output on the display unit, the translation window is positioned in one region of the display unit.

In the mobile terminal, the translation window may be positioned in a region of the display unit, on which the translation-source information portion is displayed.

In the mobile terminal, the translation window in which the translation-target information is included may be output to the region on which the translation-source information portion is displayed, in a manner that is superimposed onto the region on which the translation-source information portion is displayed, and the translation window may be configured in such a manner that the translation-source information portion can be recognized through the translation window by a user.

In the mobile terminal, the translation-source information portion may be determined based on a position of the translation window, and the controller may set as the translation-source information portion one portion of the screen information being output to the display unit, which is output to a region in which the translation window is positioned.

In the mobile terminal, the translation window may be moved based on a touch being applied to the translation window, and the translation-target information that is included in the translation window is changed based on the movement of the translation window.

In the mobile terminal, when the translation window is moved, one portion of the screen information being output to the display unit, which is output to a region to which the translation window is moved, may be translated, and the translation-target information into which the one portion of the screen information is translated may be output to the moved translation window.

In the mobile terminal, the translation-source information portion may be determined based on a size of a region of the display unit, occupied by the translation window, and the controller may set as the translation-source information portion one portion of the screen information, which is output to the region occupied by the translation window.

In the mobile terminal, the translation window may be moved along a touch being applied to the display unit, and when the translation window reaches a border region of the display unit while moved along the touch, the controller may translate the entire screen information that is output to the display unit and may output on the translation window the translation-source information into which the entire screen information is translated.

In the mobile terminal, if the translation window reaches the border region of the display unit, the controller may change a size of the translation window in such a manner that the size of the translation window corresponds to a size of an output region of the display unit and may output the translation-target information into which the entire screen information that is output to the display unit is translated, on the translation window whose size is changed.

In the mobile terminal, the touch that moves the translation window may be a flicking touch that is applied to translation window at a predetermined speed or higher.

In the mobile terminal, when a drag input is applied to the translation window in a state where the screen information is output on the display unit, the translation window may be moved along the drag input, and when the translation window is positioned in a border region of the display unit, based on the drag input being applied to the translation window and the drag input is continuously applied to the translation window in a state where the translation window is positioned in the border region of the display unit, the controller may scroll the screen information that is output on the display unit.

In the mobile terminal, if the screen information that is output on the display unit can be no longer scrolled in a state where the drag input is continuously applied to the translation window, the controller may perform a refreshing function of updating the screen information.

In the mobile terminal, when a predetermined-type touch input is applied to the translation window, the controller may determine that the translation-source information portion of the screen information is selected which corresponds to the translation-target information that is output to a region of the translation window to which the predetermined-type touch input is applied, and may performs an operation associated with the selected translation-source information portion.

In the mobile terminal, if the operation is executed, the screen information may be switched to an execution screen associated with the executed operation, the controller may continue to output the translation window independently of the switching of the screen information to the execution screen, and the translation-target information associated with the execution screen may be output on the translation window.

In the mobile terminal, the controller may translate the translation-source information portion into the translation-target information in one language that is predetermined among multiple languidness, and may change the translation-target information in the one language to translation-target information in a different language that is selected from among the multiple languages by a user.

In the mobile terminal, the selection of the language may be made based on at least one, among a predetermined-type touch input being applied to the translation window, a touch being applied to one, among multiple graphic objects that are output to the translation window, and a predetermined-type touch being applied to the graphic object that is output to the translation window.

In the mobile terminal, the translation-target information may be edited based on a user's request, and the controller may output an editing list associated with the editing of the translation-target information when the users request is received, and may edit the translation-target information in such a manner that the translation-target information corresponds to the selected item, when any one is selected from among items included in the editing list.

In the mobile terminal, when an execution command for executing a translation function is received, the controller may execute the translation function, and may determine at least one, among a position and a size of the translation window, based on a touch gesture that is applied to the display unit in a state where the translation function is executed, and the translation window that has at least one, among the position and the size that are determined, may be output on the display unit.

The mobile terminal may further include a position receiving unit that receives position information indicating where the mobile terminal is positioned, in which the controller may translate the translation-source information portion into the translation-target information in a language of a country where the mobile terminal is positioned.

In the mobile terminal, the controller may output the translation-target information not only in a visual manner, but also in an aural.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The embodiments will be described in detail with reference to the following drawings in which like reference numerals refer to like elements wherein:

FIGS. 4A(a) and 4A(b), 4B(a) and 4B(b), 4C(a) and 4C(b) are diagrams for describing the control method in FIG. 3, in the mobile terminal according to one embodiment of the present invention;

FIGS. 6A to 6C are diagrams illustrating a method of translating the entire screen information being output to the display unit if a predetermined-type touch input is applied in the mobile terminal according to one embodiment of the present invention;

FIGS. 7A to 7D are diagrams illustrating a method of scrolling the screen information using the translation window in the mobile terminal according to one embodiment of the present invention;

FIGS. 8A to 8D are diagrams illustrating a method of executing a refreshing function using the translation window in the mobile terminal according to one embodiment of the present invention;

FIGS. 9A and 9B are diagrams illustrating a method of executing a function associated with the screen information using the translation window in the mobile terminal according to one embodiment of the present invention.

FIGS. 13A and 13B are diagrams for describing a method of adjusting transparency of the translation window according to one embodiment of the present invention.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the wireless speaker, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), a Portable Multimedia Player (PMP), a navigation system, etc.

Figure 1:
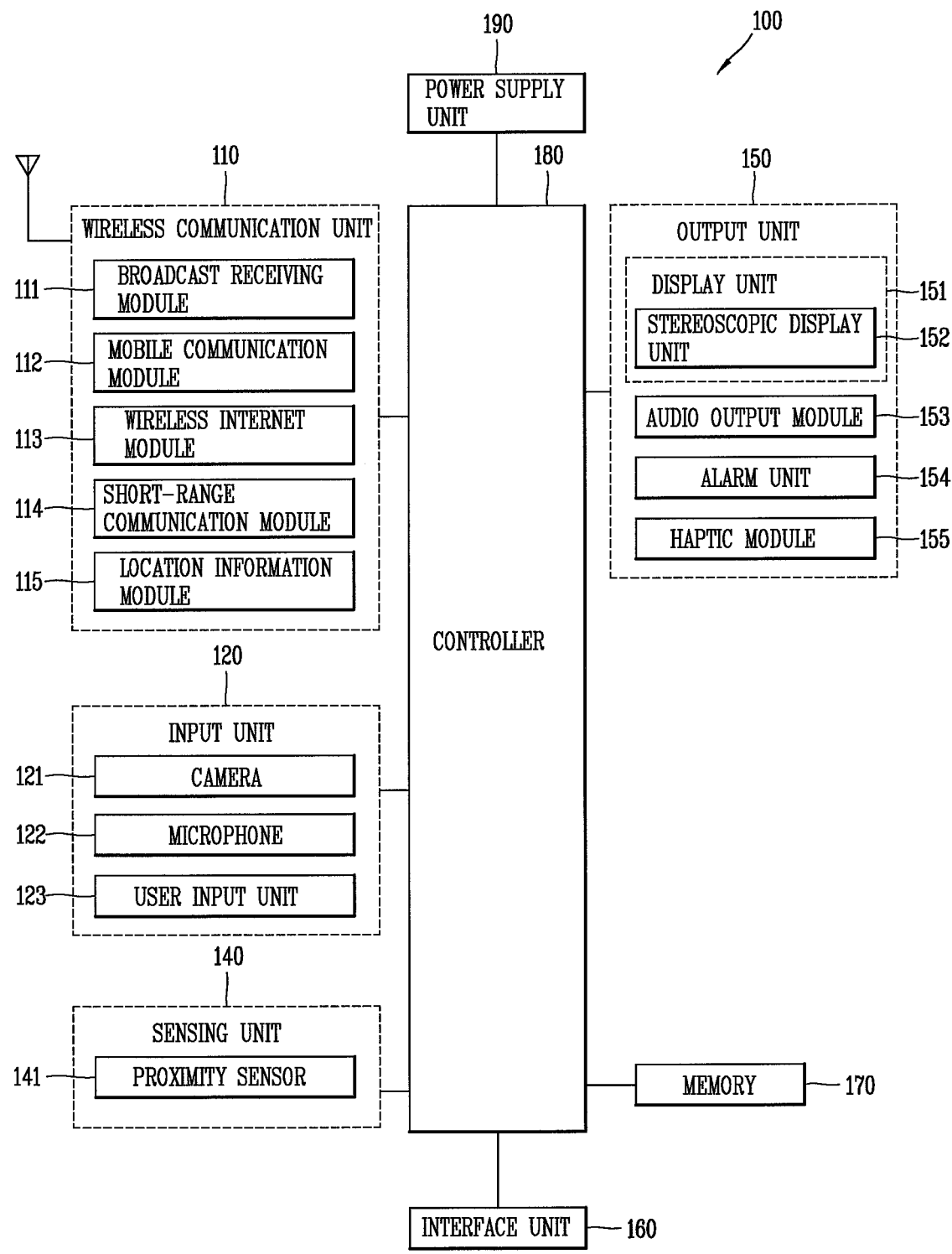
FIG. 1 is a block diagram illustrating a mobile terminal according to one embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call. When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display and a three-dimensional (3D) display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area of a touch object, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, the proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display 151 or the voice output module 152. Therefore, the display 151 and the voice output module 152 may be categorized as part of the alarm unit 153.

The haptic module 154 generates various tactile effects the user may feel. A typical example of the tactile effects generated by the haptic module 154 is vibration. The strength and pattern of the haptic module 154 are controllable. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
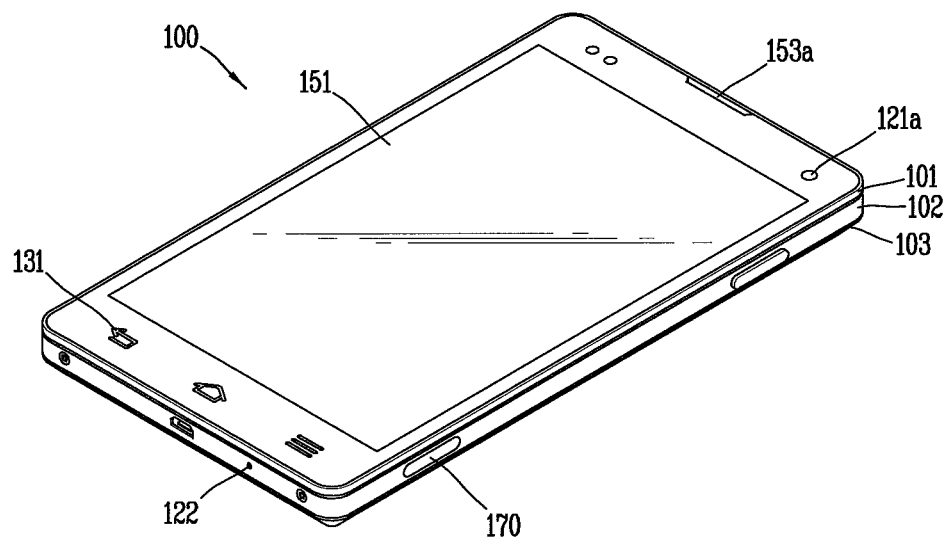
FIG. 2A is a perspective view illustrating the mobile terminal according to one embodiment of the present invention when viewed from front.
Figure 2B:
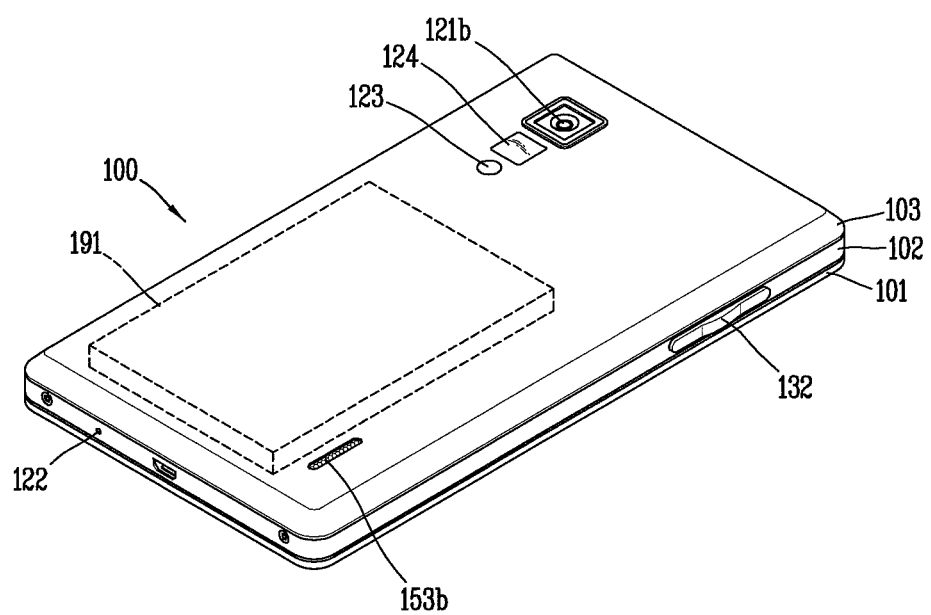
FIG. 2B is a perspective view illustrating the mobile terminal according to one embodiment of the present invention when viewed from rear.

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this case, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151.

In addition, in the mobile terminal according to one embodiment of the present invention, which is capable of including at least one or more of the constituent elements as described above, screen information that is currently output to the display unit is translated using a translation window.

Figure 3:
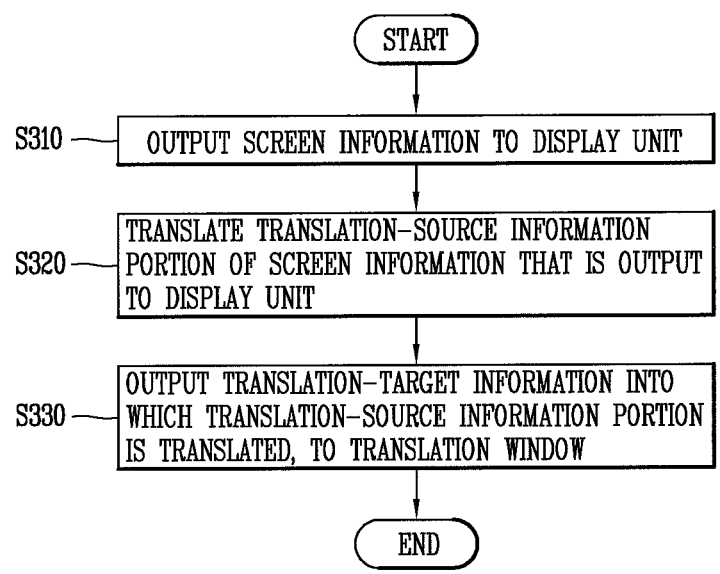
FIG. 3 is a flowchart illustrating a method of translating screen information that is output to a display unit, according to one embodiment of the present invention.

The mobile terminal is described in detail below referring to the drawings. FIG. 3 is a flowchart illustrating a method of translating the screen information that is output to the display unit, according to one embodiment of the present invention. FIGS. 4A(a) and 4A(b), 4B(a) and 4B(b), and 4C(a) and 4C(b) are diagrams for describing the control method in FIG. 3, in the mobile terminal according to one embodiment of the present invention.

The mobile terminal according to one embodiment of the present invention proceeds with a step of outputting screen information to the display unit 151 (S310).

The screen information is screen information relating to operation of the mobile terminal. For example, the screen information includes all screen information relating to the operation of the mobile terminal, such as execution screen information on an application and screen information on a home screen page.

The screen information includes all graphic objects that can be output to the display unit 151. For example, the graphic object is a text string, a still image, a moving image and so on.

In the mobile terminal according to one embodiment, a web browser application is executed. In this case, web page screen information that is accessed through the web browser application is output to the display unit 151. The web page screen information includes a text string, an image, and the like.

In a state where the screen information is output to the display unit, the mobile terminal according to one embodiment of the present invention proceeds with a step of translating translation-source information portion of the screen information that is output to the display unit (S320).

The mobile terminal according to one embodiment of the present invention may further include a translation function unit that is capable of translating the screen information that is output to the display unit 151. The translation function unit translates the translation-source information portion of the screen information that is output to the display unit 151.

The translation function unit translates the translation-source information portion after a translation function is executed in the mobile terminal. There are many ways by which the translation function is executed. As examples of such ways, there are a touch input being applied to an icon corresponding to the translation function, a predetermined-type touch input being applied to a hardware key of the mobile terminal, and a specific pattern input using a touch gesture being applied to the display unit. When the translation function is executed, the controller 180 translates the translation-source information portion of the screen information that is output to the display unit 151, using the translation function unit.

On the other hand, in the mobile terminal according to one embodiment of the present invention, although the translation function unit is not separately provided, the controller 180 functions as the translation function unit.

At this point, the controller 180 sets the translation-source information portion of the screen information that is output to the display unit 151. For example, the controller 180 sets the translation-source information portion, based on a position of the translation window with which the translation-source information portion is set. In the controller 180 according to one embodiment of the present invention, the controller 180 sets as the translation-source information portion one portion of the screen information being output to the display unit 151, which is output to a region in which the translation window is positioned.

In addition, the controller 180 sets the translation-source information portion, based on a size of the display unit that is occupied by the translation window. For example, when the size of the translation window is changed, the controller 180 sets as the translation-source information portion one portion of the screen information, which is output to a region occupied by the translation window whose size is changed.

At this point, the position and the size of the translation window is changed by a user's control command. For example, the controller 180 changes at least one of the position and the size of the translation window, based on the touch input being applied to the display unit 151.

Translation-target information into which the translation-source information portion is translated is in multiple languages. At this point, the user can set a translation-target language, among multiple languages, that is output to the translation window, in various ways, such as the selection from the multiple languages and the use of position information on the mobile terminal. For example, the user can set the translation-target language by applying the touch input to a graphic object for setting the translation-target language that is output to one region of the display unit 151. As another example, based on the position information on the mobile terminal, the controller 180 sets the translation-target language that is matched in advance to the position of the mobile terminal.

After translation of the translation-source information portion, the mobile terminal according one embodiment of the present invention proceeds with a step of outputting on the translation window the translation-target information into which the translation-source information portion is translated (S330).

If the translation-source information portion of the screen information is translated, the controller 180 outputs the translation-target information on the translation window. The translation window is a window that includes the translation-target information into which the translation-source information portion of the screen information that is output to the display unit 151 is translated.

The translation window is output to one region of the display unit 151. In a state where the screen information relating to the operation of the mobile terminal is output to the display unit 151, the translation window is output on the screen information in a manner that the is superimposed onto the screen information. As another example, the controller 180 outputs to the display unit 151 a region to which the translation window is output and a region to which the screen information is output, in such a manner that the two regions are distinguishable from each other.

The position of the translation window is predetermined or is set through the user's selection. For example, the controller 180 positions the translation window in a region to which the translation-source information portion is output, among output regions of the display unit 151.

The translation window is configured in such a manner that the translation-source information portion can be recognized through the translation window by the user. For example, transparency of the translation window is adjusted for outputting. The transparency of the translation window is adjusted through the user's selection or is automatically adjusted. For example, the user can directly set the transparency of the translation window. In addition, the transparency of the translation window is automatically adjusted based on predetermined conditions (for example, ambient intensity of illumination, a direction of a user's gaze and so on). At this point, the controller 180 concurrently outputs the translation-target information and the translation-source information portion on the translation window through the use of the transparency adjustment of the translation window.

The mobile terminal according to one embodiment of the present invention outputs the translation-target information not only in a visual manner, but also in an aural manner. For example, if a moving image is reproduced in the mobile terminal, when the moving image is positioned in a region to which the moving image is output, a translation-source voice portion of the moving image is translated into a translation-target voice portion and the translation-target voice portion is output.

At this point, the controller 180 performs translation using image information and explanatory-title information included in a file of the moving image. At this point, the translation-target voice portion is output an appropriate point of time in such a manner that the image and the voice are matched with each other using matching information included in the file of the moving image. In addition, the translation-source explanatory titles are translated into translation-target explanatory titles, and the translation-target explanatory titles are output, along with the translation-target voice portion.

On the other hand, a translation function is terminated through the translation window, based on a user's termination command. At this point, when the translation function is terminated, the translation window is no longer output to the display unit 151. For example, a graphic object that indicates a function of terminating the translation function is output to one region of the translation window. The user can enable the translation window to be no longer output using the touch input being applied to the graphic object.

Various methods of outputting the translation-target information to the translation window are described in more detail below referring to the drawings.

According to one embodiment, as illustrated in FIG. 4A(a), the screen information is output to the display unit 151. According to one embodiment, the screen information includes a text string, an image, and the like.

The controller 180 translates the translation-source information portion of the screen information that is output to the display unit 180. At this point, the translation-source information portion is the screen information that is output to the region in which the translation window is positioned.

The translation window is output to one region of the display unit 151 using various control commands. For example, the translation window is output using the control command that is generated using a pen unit for applying the touch input to the display unit 151. At this point, the control command being generated with the pen unit is a control command that applies the specific pattern input to the display unit 151 using the pen unit.

When the translation window is output, the controller 180 translates the translation-source information portion of the screen information, which is output to the region in which the translation window is positioned, using the translation function unit. For example, as illustrated in FIG. 4A(b), if a translation window 410 is output to the display unit 151, the controller 180 translates the translation-source information portion that is output to the region in which the translation window is positioned.

The controller 180 translates the translation-source information portion and then outputs to the translation window the translation-target information into which the translation-source information portion is translated. At this point, the translation-target information is output to the translation window in a manner that is superimposed onto the screen information. There are various methods in which the controller 180 outputs the translation-target information to the translation window in a manner that is superimposed onto the screen information.

According to one embodiment, referring to FIG. 4A(b), the controller 180 outputs the translation-target information, which is output to the translation window 410, to a region of the translation window 410, which corresponds to a region in which the translation-source information portion is positioned. For example, the region that corresponds to the region in which the translation-source information portion is positioned is a region of the translation window that corresponds to a region adjacent to a position to which the translation-source information portion is output.

In addition, the controller 180 performs control in such a manner that the translation-source information portion and the translation-target information that are to be output to the region in which the translation window is positioned are output concurrently. At this point, the controller 180 controls the translation window in such a manner that the translation-source information portion is output through the translation window. For example, the controller 180 adjusts the transparency of each of the translation-source information portion and the translation-target information and outputs them. Accordingly, the user can concurrently view the pre-translation translation-source information portion and the translation-target information into which the translation-source information portion is translated.

According to another embodiment, referring to FIG. 4B(b), the controller 180 outputs the translation-target information, which is output to a translation window 420, to a region of the translation window 420 that corresponds to the region in which the translation-source information portion is positioned. For example, the region of the translation window 420 that corresponds to the region in which the translation-source information portion is positioned is the position to which the translation-source information is output.

At this point, the controller 180 enables the translation-source information portion to be no longer output on the display unit 151. Instead of the translation-source information portion, the controller 180 outputs the translation-target information, into which the translation-source information portion is translated, on the translation window 420. In this case, the user can view only the translation-target information without the translation-source information portion.

According to another embodiment, referring to FIG. 4C(b), the controller 180 outputs both of the translation-target information and the translation-source information portion to a translation window 430. In this case, the translation window is an opaque window 430. At this point, the controller 180 outputs to the translation window 430 both of the translation-source information portion and the translation-target information that are previously output to the region in which the translation window 430 is positioned. For example, as illustrated in FIG. 4C(b), the controller 180 outputs the translation-source information portion and the translation-target information to the opaque translation window 430.

As a representative example, concurrent outputting of the screen information portion and the translation-target information through the user of the transparency adjustment of the translation window as illustrated in FIG. 4A(b) is described below. However, the present invention is not limited to the concurrent outputting, and all the methods of outputting the translation window as described in FIGS. 4B and 4C can be applied.

The method is described above in which at least one portion of the screen information that is output to the display unit is set as the translation-source information portion using the translation window and the translation-source information portion is output to the translation window. Accordingly, the user can translate the screen information that is output to his desired position. Therefore, according to the embodiments of the present invention, the translation-target information and the translation-source information portion are concurrently output using translation window, and thus the translation-source information portion and the translation-target information are together provided to the user.

Changing of the translation-target information being output to the translation window, which is based on attribute information on the translation window, is described below. FIGS. 5A(a) and 5A(b) and 5B(a) and 5B(b) are diagrams illustrating the changing of the translation-target information, which is based on the attribute information on the translation window, in the mobile terminal according to one embodiment of the present invention.

The controller 180 changes the translation-target information that is output to the translation window, based on the attribute information on the translation window. The attribute information on the translation window is at least one, among size information and position information on the translation window.

First, the controller 180 changes the translation-target information that is output to the translation window 410, based on the position of the translation window 410. For example, referring to FIG. 5A(a), the translation window 410 is moved based on the user's touch being applied to the display unit 151.

When the translation window 410 is moved, the controller 180 changes the translation-target information that is output to the translation window 410. The translation-target information that is changed corresponds to the translation-source portion of the screen information that is output to a position to which the translation window 410 is moved. At this point, the controller 180 sets as the translation-source information portion one portion of the screen information being output to the position to which the translation window 410 is moved.

The controller 180 translates the changed translation-source information portion and then outputs to the translation window 410 the translation-target information into which the changed translation-source information portion is translated. For example, as illustrated in FIG. 5A(b), the translation-target information, into which the translation-source information portion of the screen information being output to a position to which the translation window 410 is moved is translated, is output to the translation window 410.

On the other hand, if the translation-target information that is output to the translation window 410 is changed to the translation-target information into which the translation-source information portion of the screen information is translated, the translation-target information that is output before the translation window 410 is moved is no longer output. In addition, the controller 180 no longer the translation-source information portion prior to the movement of the translation window 410.

Figure 5B:
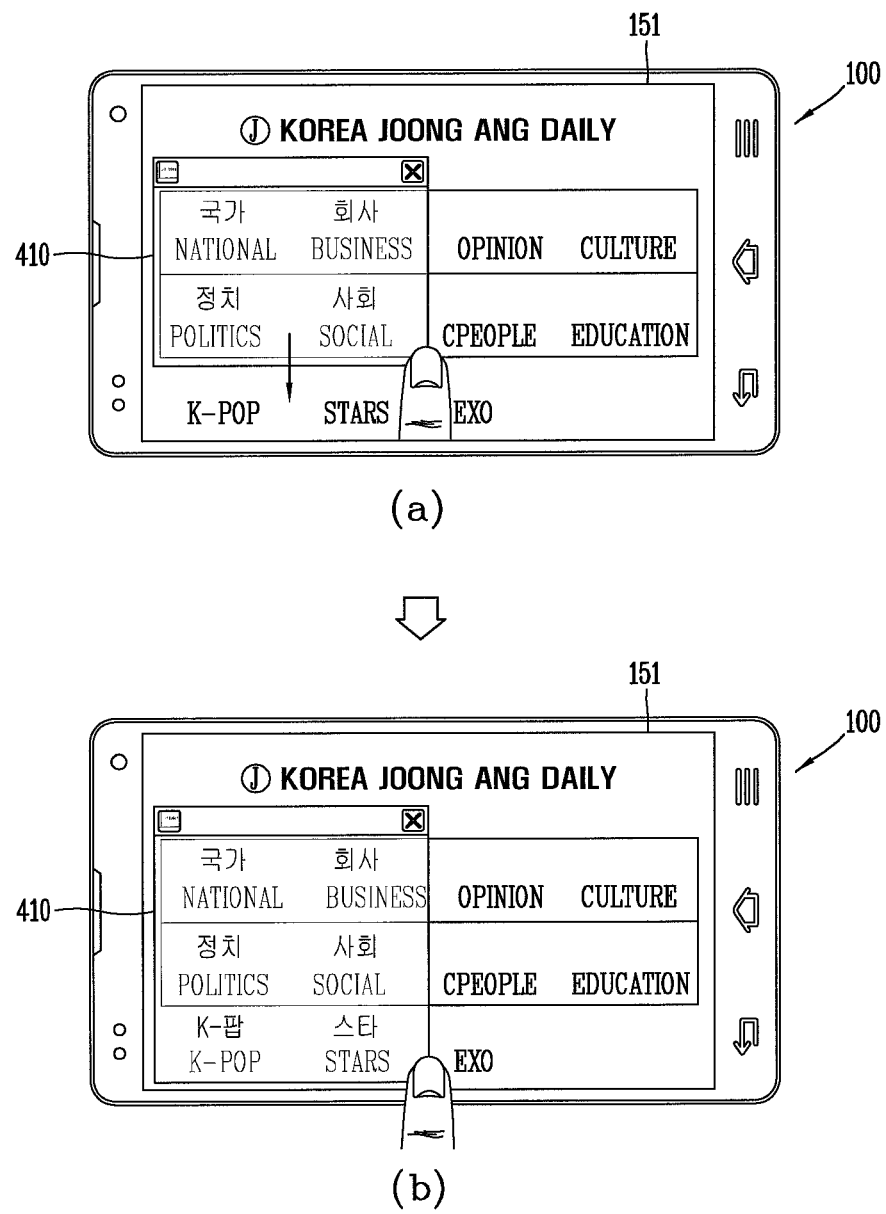
FIGS. 5A(a) and 5A(b) and 5B(a) to 5B(b) are diagrams illustrating changing of translation-target information, which is based on attribute information on a translation window, in the mobile terminal according to one embodiment of the present invention.

First, the controller 180 sets the translation-target information that is output to the translation window 410, based on the size of the translation window 410. The size of the display unit 151 that is occupied by the window 410 is changed based on the user's touch. For example, as illustrated in FIG. 5B(a), the user can apply the touch to the translation window 410. At this point, the size of the translation window 410 is changed according to the user's touch.

The controller 180 sets the translation-source information portion of the screen information that is output to the display unit 151, based on the size of the display unit 151 that is occupied by the translation window 410. For example, if the size of the region occupied by the translation window 410 is enlarged, the controller 180 sets as the translation-source information portion one portion of the screen information that is output to the region occupied by the translation window 410. For example, when the size of the translation window 410 is enlarged as illustrated in FIG. 5B(b), the controller 180 sets the translation-source information portion one portion of the screen information that corresponds to the enlarged size.

When the one portion of the screen information is set as the translation-source information portion, the controller 180 translates the one portion of the screen information being set as the translation-source information portion, using the translation function unit. Subsequently, the controller 180 outputs to the translation window 410 the translation-target information into which the one portion of the screen information portion is translated.

The changing of the translation-target information being output to the translation window 410, which is based on the changing of the attribute information on the translation window, is described above. The user can translate one portion of the screen information that is output to his/her desired position, by changing the position of the translation window 410. In addition, the user can translate a portion of the screen information as large as he/she desires, by changing the size of the translation window.

A method of translating the entire screen information being output to the display unit using a predetermined-type touch input is described below. FIGS. 6A to 6C are diagrams illustrating a method of translating the entire screen information being output to the display unit if the predetermined-type touch input is applied in the mobile terminal according to one embodiment of the present invention.

The controller 180 moves the translation window, based on the touch being applied to the translation window. For example, the translation window is moved along a drag input.

The controller 180 controls the screen information being output to the display unit 151 in various ways, based on the movement of the translation window 410. According to one embodiment of the present invention, when the translation window 410 is moved, the controller 180 translates the screen information being output to the display unit 151 in its entirety.

The movement of the translation window 410 occurs by the user's touch. At this point, examples of the user's touch input, there are a drag input, a flicking input, and the like. For example, referring to FIG. 6A, the movement of the translation window 410 occurs by the flicking input at a predetermined speed or higher.

Based on the user's touch, the controller 180 performs control in such a manner that while the translation window 410 is moved, the translation window 410 is positioned in a border region of the display unit 151. The border region of the display unit 151 means a border region of the region, to which the screen information is output, of the display unit 151. At this point, the translation window 410 is positioned in one among upper, lower, left, and right border regions. According to one embodiment of the present invention, as illustrated in FIG. 6B, the translation window 410 is positioned in the lower border region.

If the translation window 410 is positioned in the border region, the controller 180 translates the entire screen information that is output to the display unit 151. In addition, if the entire screen information is translated, the controller 180 changes the size of the translation window 410. According to one embodiment, as illustrated in FIG. 6C, the size of the translation window 410 is changed in a manner that corresponds to the size of an output region of the display unit 151.

The changing of the entire screen information that is based on the predetermined-type touch being applied to the translation window is described above. Accordingly, according to the embodiments of the present invention, the entire screen information is translated easily and speedily only with the touch being applied to the translation.

A method of scrolling the screen information being output to the display unit, based on the movement of the translation window, is described below.

FIGS. 7A to 7D are diagrams illustrating the method of scrolling the screen information using the translation window in the mobile terminal according to one embodiment of the present invention.

The controller 180 moves the translation window 410, based on the user's touch being applied to the translation window 410. For example, the translation window 410 is moved along the drag applied to the translation window 410. For example, referring to FIGS. 7A and 7B, the translation window 410 is moved in a direction that corresponds to the direction in the drag is applied. On the other hand, if the number of items of screen information is greater than that of the output region of the display unit 151, the controller 180 outputs a scroll bar 700 to one region of the display unit 151. For example, as illustrated in FIG. 7A, the scroll bar 700 is output to one region of the display unit 151.

If the user's touch is continuously applied in a state where the translation window is positioned in the border region, the controller 180, the controller 180 scrolls the screen information that is output to the display unit 151, based on the movement of the translation window. For example, the screen information that is output to the display unit 151 is moved in the direction opposite to the direction in which the drag is applied.

For example, as illustrated in FIG. 7C, the translation window 410 is positioned in the border region of the display unit. If the user's drag input is continuously applied in a state where the translation window 410 is positioned in the border region, the screen information that is output to the display unit 151 is moved. For example, as illustrated in FIG. 7D, the screen information that is output to the display unit 151 is moved in the direction opposite to the direction in which the drag is applied. Likewise, the scroll bar 700 may be moved in the same direction as the direction in which the drag is applied.

The method of scrolling the screen information that is output to the display unit, based on the drag input being applied to the translation window, is described above. Accordingly, the user can use the translation window in various ways.

A method of controlling the screen information that is output to the display unit, based on the touch being applied to the translation window, is described below.

FIGS. 8A to 8D are diagrams illustrating a method of executing a refreshing function using the translation window in the mobile terminal according to one embodiment of the present invention.

Based on the touch being applied to the translation window 410 that is output to the display unit, the controller 180 moves the translation window 410. When the touch is continuously applied in a state where the translation window 410 is the border region of the display unit 151, the controller 180 scrolls the screen information that is output to the display unit 151.

On the other hand, if the screen information can be no longer scrolled, the controller 180 executes the refreshing function. The correction function means updating of the screen information through communication with a server. For example, as illustrated in FIG. 8C, the screen information is no longer scrolled based on the touch being applied to the translation window 410. In this case, as illustrated in FIG. 8D, the controller 180 performs refreshing 800.

The method of refreshing the screen information using the touch being applied to the translation window is described above. Accordingly, the user conveniently refreshes the screen information that is output to the display unit 151, using the translation window.

A method of executing a function associated with the screen information using the translation-target information that is output to the translation window. FIGS. 9(a) and 9(b) are diagrams illustrating the method of executing a function associated with the screen information using the translation window in the mobile terminal according to one embodiment of the present invention.

The controller 180 executes the function associated with the screen information that is output to the display unit 151, using the translation-target information that is output to the translation window 410.

Examples of the function associated with the screen information, there are various functions according to types of the screen information, such as moving to a web address that is pre-set in the screen information, reproducing an image that is pre-set in the screen information, and executing an application that corresponds to the screen information.

Based on the user's predetermined-type touch input being applied to the translation-target information, the controller 180 executes the function associated with one portion of the screen information that corresponds to the translation-target information. Examples of the predetermined-type touch input, there are various types of touch inputs, such as a long touch input, a double touch input, and a flicking input.

According to one embodiment of the present invention, as illustrated in FIG. 9(a), a web browser page 900 is output to the display unit 151. At this point, the translation-target information is output to the translation window 410 that is output one region of the display unit 151.

At this point, the user can apply the predetermined-type touch input to the translation-target information. For example, as illustrated in FIG. 9(a), the user can apply the long touch to the translation-target information.

When the predetermined-type touch input is applied, the controller 180 executes the function associated with the screen information that corresponds to one portion of the translation-target information to which the predetermined-type touch input is applied. For example, the translation-target information is translation-target information into which one portion of web browser screen information is translated. At this point, when the predetermined-type touch input is applied to the translation-target information, the controller 180, as illustrated in FIG. 9(b), performs the accessing to the web address that is pre-set in the web browser screen information.

On the other hand, when the function associated with one portion of the screen information that corresponds to the translation-target information is executed, the controller 180 outputs an execution screen 910 of the function associated with the one portion of the screen information. At this point, even though the changing to the execution screen associated with the screen information is performed, the controller 180 maintains the translation window being output, as is. At this point, the controller 180 changes the translation-target information that is output to the translation window 410. For example, as illustrated in FIG. 9(b), the translation-target information into which one portion of a screen information in the execution screen 910 associated with the screen information is translated is output to the translation window 410.

The method of executing the function associated with the screen information being output to the display unit 151, using the translation-target information that is output to the translation window, is described above. Accordingly, the user can easily execute the function associated with the screen information, using the translation-target information.

Figure 10A:
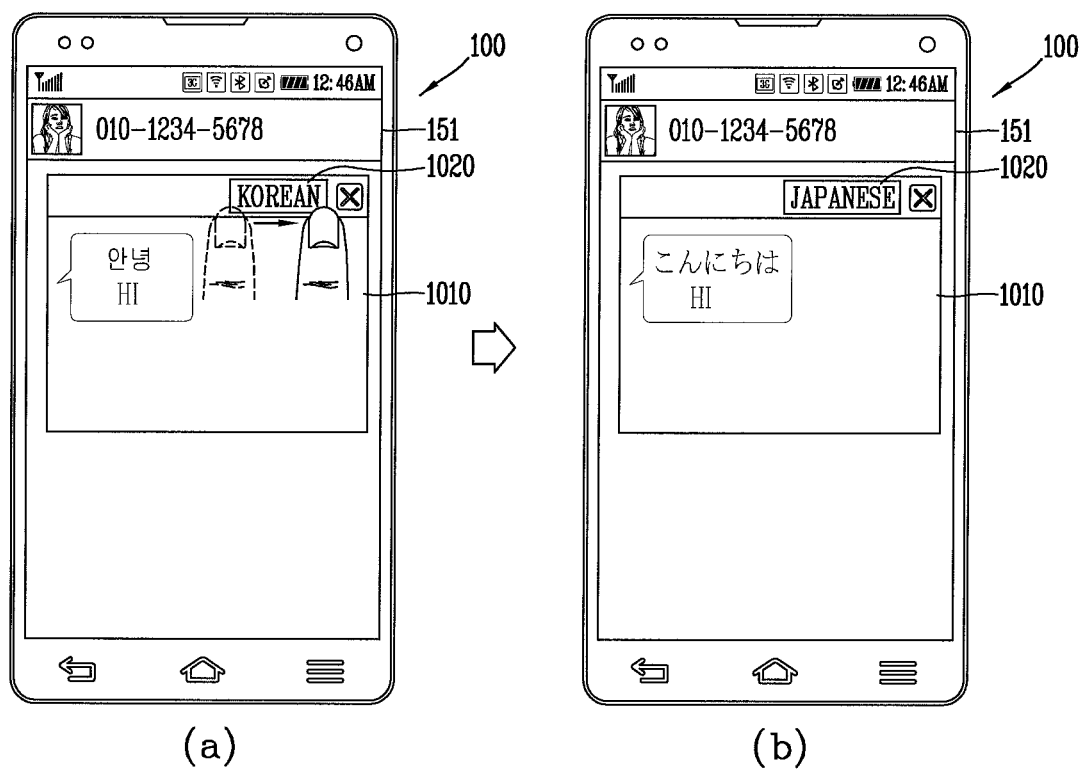
FIGS. 10A(a) and 10A(b), 10B(a) and 10B(b), and to 10C(a) and 10C(b) are diagrams illustrating a method of changing a translation-target language that is output to the translation window in the mobile terminal according to one embodiment of the present invention.

A method of changing the translation-target language that is output to the translation window is described below. FIGS. 10A(a) and 10A(b), 10B(a) to 10B(b), 10C(a) and 10C(b) are diagrams illustrating the method of changing the translation-target language that is output to the translation window in the mobile terminal according to one embodiment of the present invention.

The controller 180 translates the screen information being output to the display unit 151 in various languages. At this point, the translation-target language in which the screen information is translated is set through the user's selection.

The method of selecting the translation-target language is determined based on at least one, among the predetermined-type touch input being applied to the translation window, the touch being applied to any one of the multiple graphic objects that are output to the translation window, and the predetermined-type touch being applied to the graphic object that is output to the translation window.

For example, as illustrated in FIG. 10A(a), a graphic object 1020 for selecting the translation-target language is output to one region of a translation window 1010. A function of setting any one of the multiple languages as the translation-target language corresponds to the graphic object 1020.

At this point, the controller 180 changes the translation-target language, based on the application of the predetermined-type touch input to the graphic object 1020 for selecting the translation-target language. For example, as illustrated in FIG. 10A(a), the predetermined-type touch input is the flicking touch.

When the predetermined-type touch input is applied, the controller 180 changes the translation-target language and thus outputs to the translation window 1010 the translation-target information into which the translation-source information portion of the screen information is translated. For example, if the translation-target language is changed from Korean to Japanese as illustrated in FIG. 10A(b), the translation-target information that is output to the translation window 1010 is the translation-target information in Japanese.

Figure 10B:
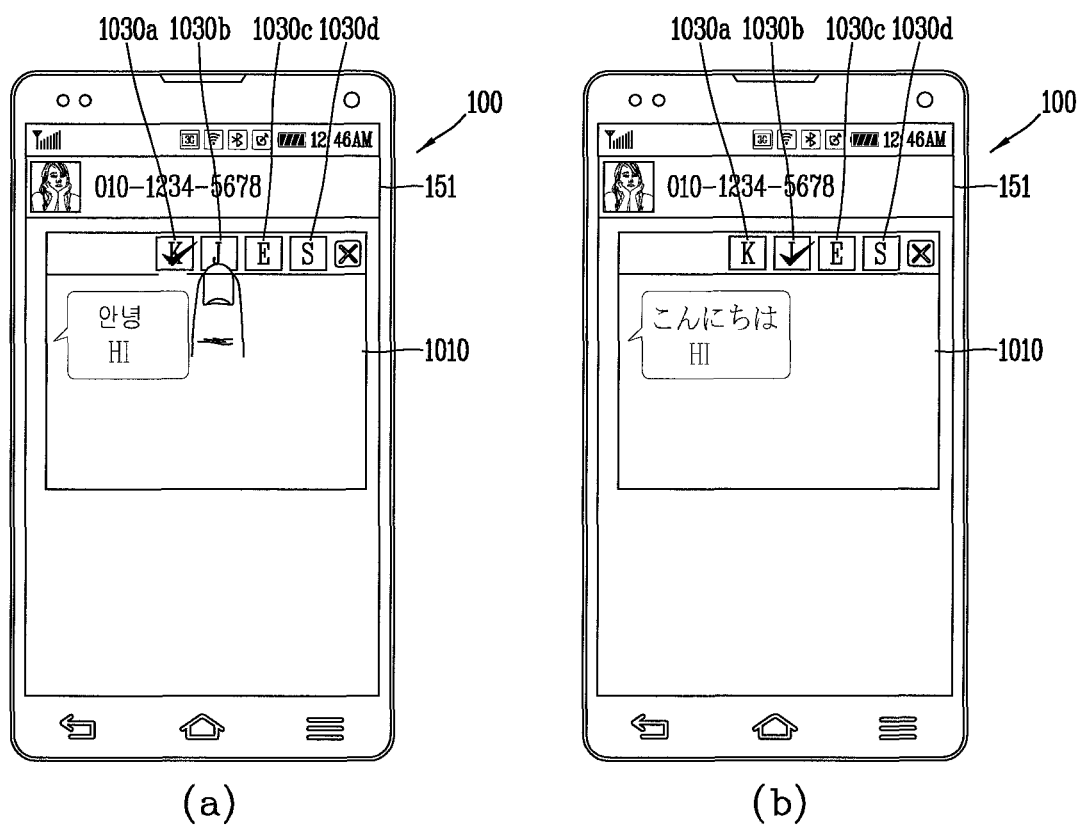

As another example, as illustrated in FIG. 10B(a), multiple graphic objects 1030a, 1030b, 1030c, and 1030d that correspond to the multiple languages, respectively, are output to one region of the translation window 1010.

At this point, the controller 180 selects the language in which the translation-source information portion of the screen information is translated into the translation-target information, based on the user's touch input being applied to any one of the multiple graphic objects. For example, referring to FIGS. 10B(a) and 10(b), the translation-target information in Korean is changed to the translation-target information in Japanese, based on the user's touch input.

On the other hand, the translation-target language is changed based on a predetermined condition. Changing of the translation-target language that is output to the translation window, based on a position of the mobile terminal, is described below.

The mobile terminal according to one embodiment of the present invention further includes a position receiving unit that receives position information on the mobile terminal. For example, the position receiving unit is a global positioning system (GPS) receiver.

The controller 180 determines the position information on the mobile terminal, using the position receiving unit. At this point, the controller 180 changes the translation-target language, based on the current position of the mobile terminal. In this case, the translation-target language that results from the change is matched to the current position of the mobile terminal.

Figure 10C:
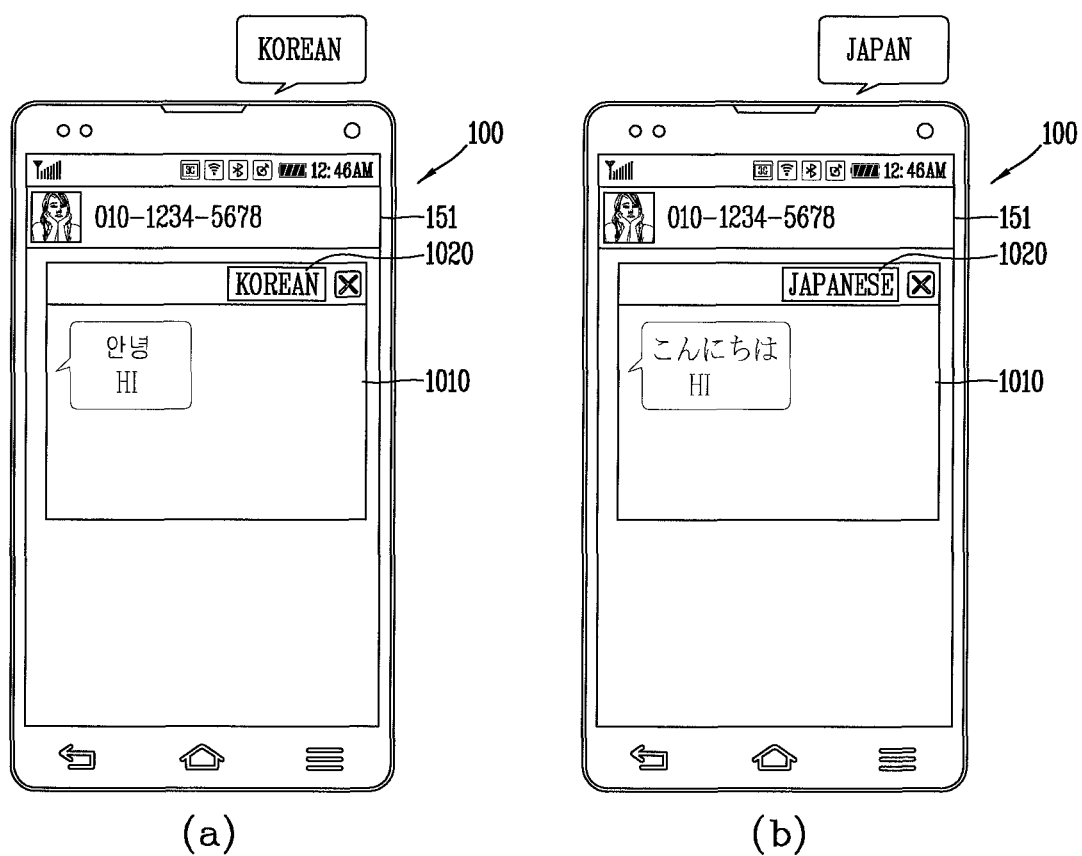

For example, as illustrated in FIG. 10C(a), if the position of the mobile terminal is in Korea, the translation-target language is set as Korean 1020. As another example, illustrated in FIG. 10C(b), if the position of the mobile terminal is in Japan, the translation-target language is set as Japanese 1020.

The method of changing the translation-target language in which the translation-source information portion of the screen information is translated into the translation-target information that is output to the translation window is described above. Accordingly, the user can view the translation-target information in various languages. In addition, the translation-target language is changed only with the touch input being applied to the graphic object. Furthermore, the controller automatically changes the translation-target languages to the languages of a county where the user stays, and this increases user convenience.

Figure 11:
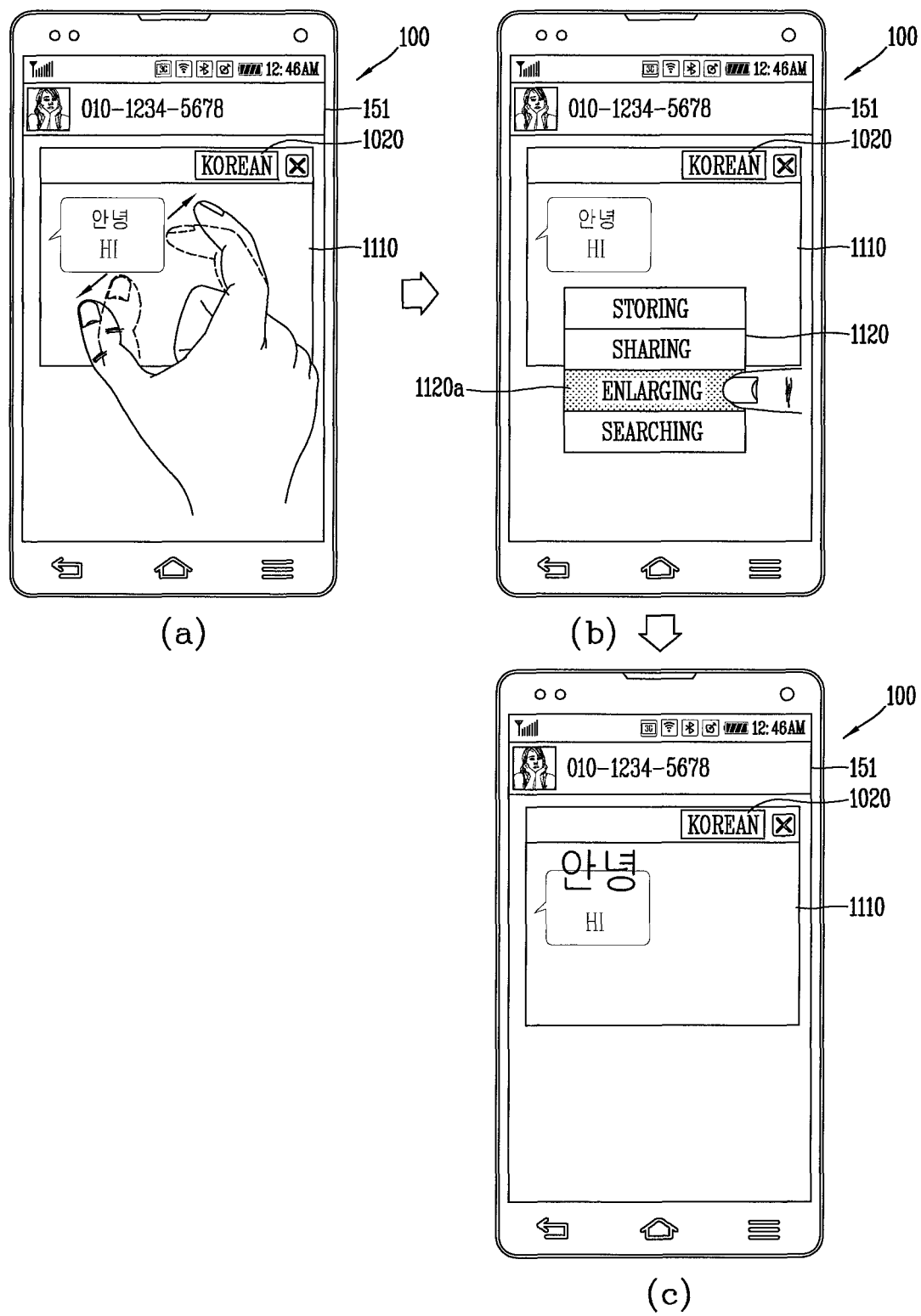
FIGS. 11A to 11C are diagrams illustrating a method of editing the translation-target information that is output to the translation window in the mobile terminal according to one embodiment of the present invention.

A method of editing the screen information that is output to the translation window is described below. FIGS. 11A to 11C are diagrams illustrating a method of editing the translation-target information that is output to the translation window in the mobile terminal according to one embodiment of the present invention.

When a user's request for the translation window is received, the controller 180 outputs an editing list associated with the editing of the translation-target information. The editing list associated with the editing of the translation-target information is an editing list that includes at least two items, among storing, sharing, enlarging, and searching items.

The user's request is a predetermined-type touch input being applied to the translation window 1110. As examples of the predetermined-type touch input, there are various types of touch inputs, such as a pinch-in input, a pinch-out input, a long-touch input, and a multi-touch input. For example, as illustrated in FIG. the predetermined-type touch input is the pinch-in input. At this point, referring to FIG. 11B, when the user's request for the translation window 1110, the controller 180 outputs an editing list 1120.

After the editing list 1120 is output, the user can select any one of the items included in the editing list 1120. For example, as illustrated in FIG. 11B, the user can select an enlarging item 1120a from the items included in the editing list. At this point, as illustrated in FIG. 11C, the controller 180 enlarges and outputs the translation-target information to the translation window 1110.

Although not illustrated, even though the different item (for example, the storing item, the sharing item, or the searching item) is selected, the controller executes a function corresponding to the selected item with respect to the translation-target information.

The method of editing the translation-target information that is output to the translation window is described above. Accordingly, the user can edit the translation-target information directly on the translation window. In addition, the user can use the edited translation-target information in various ways.

Figure 12C:
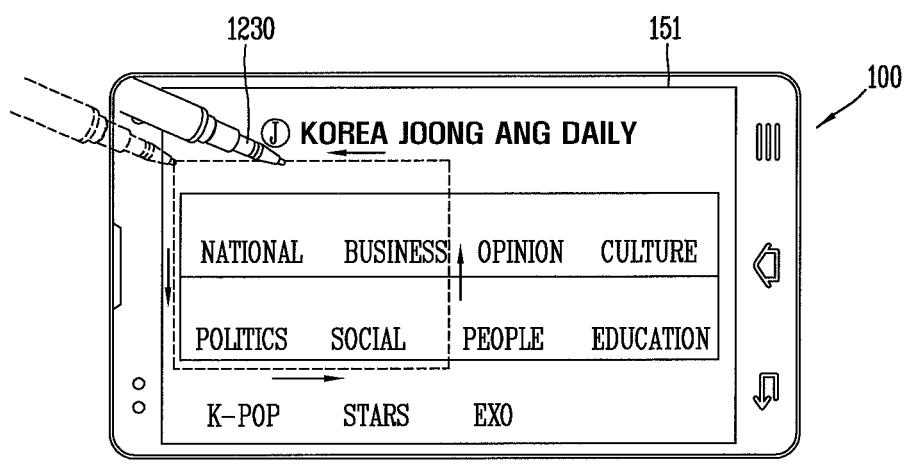
FIGS. 12A(a) to and 12A(b), FIGS. 12B(a) and 12B(b), and FIG. 12C are diagrams illustrating a method of executing a translation application in the mobile terminal according to one embodiment of the present invention.

A method of setting a region for the translation window, among regions of the display unit, is described below. FIGS. 12A(a) and 12A(b), FIGS. 12B(a) and 12B(b), and FIG. 12C are diagrams illustrating a method of executing a translation application in the mobile terminal according to one embodiment of the present invention.

The controller 180 executes the translation application for translating the screen information, using various ways. As examples of the method of executing the translation application, there are a method of applying pressure to an operation unit, a method of applying the touch applying to an icon corresponding to the translation application, a method of applying a predetermined-type touch input to a hardware key, and so on. For example, the translation application is executed by applying the long touch input to the hardware key.

When the translation the application is executed, the translation window is output to one region of the display unit 151, based on the user's control command. For example, as illustrated in FIG. 12A(a), an icon 1260 indicating that the translation window is executed is output to one region of the display unit 151. At this point, the icon is output to a status bar to which a status of the mobile terminal is output, or is output to a region to which the screen information associated with the operation in progress on the mobile terminal is output. At this point, the user can output the translation window to one region of the display unit 151 by applying the touch input to the icon 1260 indicating that the translation window is executed.

On the other hand, in a state where the application is executed, the controller 180 determines at least one of the position and the size of the translation window, based on the control command applied to the display unit 151.

For example, as illustrated in FIG. 12B(a) the controller 180 determines at least one of the position and the size of the translation window, based on the application of the touch input to the display unit 151. At this point, according to one embodiment of the present invention, the touch input with which the position and the size of the translation window is selected is a pattern input that takes the shape of a closed circle.

The controller 180 sets as a region for a translation region 1220 a region that corresponds to the application of the touch input. For example, as illustrated in FIG. 12B(b), the controller 180 outputs the translation window 1220 to a region that is set in such a manner that the position and size of the translation window 1220 corresponds to the region that is set.

In addition, the controller 180 outputs to the translation window 1220 the translation-target information into which one portion of the screen information, as large as the size of the region occupied by the translation window 1220, is translated.

On the other hand, the touch input is applied using a touch pen for applying the touch input to the display unit 151.

For example, if the pattern input that takes the shape of a closed figure is applied using the touch pen as illustrated in FIGS. 12C(a) and 12C(b), at least one of the position and the size of the translation window is determined.

The method of setting at least one of the position and the size of the translation window is described above. Accordingly, the user can simply set the region for the translation window using the touch input. In addition, the user can set the translation-source information portion through the setting of the region for the translation window.

The adjusting of the transparency of the translation window is described below. FIGS. 13A and 13B are diagrams for describing a method of adjusting the transparency of the translation window according to one embodiment of the present invention.

A translation window 1400 is output to one region of the display unit 151 in a manner that is superimposed onto the one region of the display unit 151. At this point, the controller 180 adjusts the transparency of the translation window and thus concurrently outputs the screen information that is output to the display unit 151 and the translation-target information that is output to the translation window 1400.

The transparency of the translation window 1400 is adjusted automatically and manually. As one example of manually adjusting the transparency of the translation window, a graphic object 1410 for adjusting the transparency of the translation window 1400 is output to one region of the translation window 1400. At this point, based on the touch being applied to the graphic object 1400 for adjusting the transparency, the controller 180 adjusts the transparency of the translation window 1400.

For example, as illustrated in FIG. 13A, the user can apply the touch input to the graphic object 1410 for adjusting the transparency. In this case, based on the user's touch, the controller 180 adjusts the transparency of the translation window. For example, as illustrated in FIG. 13B, the controller 180 lowers the transparency of the translation window, based on the user's touch.

According to the embodiments of the present invention, a region of the screen information being output to the display unit 151, in which the translation window is positioned, is translated using the translation window for translating the screen information that is output to the display unit 151. Accordingly, the user can translate one portion of the screen information that is output to his/her desired region.

In addition, according to the embodiments of the present invention, various functions associated with a portion of the screen information that corresponds to the translation-target information are executed using the translation-target information that is output to the translation window. Accordingly, the user can obtain the translation-target information, but also rightly use a translated portion of the screen information using the translation-target information. This provides the user with an intuitive, convenient user interface.

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display unit to display screen information;
   a translation function unit to translate a translation-source information of the displayed screen information; and
   a controller configured to:
   display a translation window overlapping with the screen information;
   determine the translation-source information based on a display region of the translation window;
   translate the determined translation-source information using the translation function unit;
   display, on the translation window, translation-target information translated from the translated translation-source information;
   receive a predetermined-type touch input applied to the translation-target information displayed on the translation window,
   determine a portion of the translation-source information that corresponds to the translation-target information that is output to a region corresponding to the translation window to which the predetermined-type touch input is received; and
   in response to the predetermined-type touch input applied to the translation-target information, perform an operation associated with the translation source information.

2. The mobile terminal of claim 1, wherein the translation window is displayed in a region in which the translation-source information is displayed.

3. The mobile terminal of claim 2, wherein the translation window that includes the translation-target information is displayed at the region in which the translation-source information is displayed, and such that the translation window is superimposed on the region in which the translation-source information is displayed, and
   wherein the translation window is configured such that the translation-source information can be recognized at the translation window.

4. The mobile terminal of claim 1, wherein the translation-source information is determined based on a position of the translation window, and
   wherein the controller sets, as the translation-source information, a portion of the displayed screen information that is output to the region corresponding to the translation window.

5. The mobile terminal of claim 4, wherein the controller moves the translation window based on a touch input to the translation window, and
   wherein the translation-target information included in the translation window changes based on movement of the translation window.

6. The mobile terminal of claim 1, wherein the translation-source information is determined based on a size of a region of the display unit corresponding to the translation window, and
   wherein the controller sets, as the translation-source information, a portion of the screen information displayed at the region corresponding to the translation window.

7. The mobile terminal of claim 1, wherein the translation window is movable based on a touch input to the display unit, and
   wherein when the translation window reaches a border region of the display unit while being moved based on the touch input, the controller to translate the entire screen information displayed on the display unit and to display, at the translation window, the translation-source information into which the entire screen information is translated.

8. The mobile terminal of claim 7, wherein when the translation window reaches the border region of the display unit, the controller to change a size of the translation window such that the size of the translation window corresponds to a size of an output region of the display unit and to output the translation-target information into which the entire screen information that is output to the display unit is translated, on the translation window whose size is changed.

9. The mobile terminal of claim 1, wherein when a drag input is applied to the translation window when the screen information is displayed on the display unit, the translation window is moved based on the drag input, and
   wherein when the translation window is in a border region of the display unit, based on the drag input applied to the translation window when the drag input is continuously applied to the translation window in a state where the translation window is positioned in the border region of the display unit, the controller to scroll the screen information that is displayed on the display unit.

10. The mobile terminal of claim 9, wherein when the displayed screen information can be no longer scrolled when the drag input is continuously applied to the translation window, the controller to perform a refreshing function of updating the screen information.

11. The mobile terminal of claim 1, wherein when the operation is executed, the screen information is changed to an execution screen associated with the executed operation, the controller to continue to display the translation window independently of the changing of the screen information to the execution screen, and the translation-target information associated with the execution screen is displayed on the translation window.

12. The mobile terminal of claim 1, wherein the controller to translate the translation-source information into the translation-target information in one language among a plurality of languages, and to change the translation-target information in the one language to translation-target information in a different language that is selected from among the plurality of languages by a user.

13. The mobile terminal of claim 12, wherein the selection of the language is based on at least one, among a predetermined-type touch input applied to the translation window, a touch being applied to one, among a plurality of graphic objects that are displayed at the translation window, and a predetermined-type touch applied to the graphic object that is displayed at the translation window.

14. The mobile terminal of claim 1, wherein the translation-target information is edited based on a user's request,
    wherein in response to receiving the user's request, the controller to display an editing list associated with the editing of the translation-target information, and
    wherein when any one item is selected from among items included in the editing list, the controller to edit the translation-target information such that the translation-target information corresponds to the selected item.

15. The mobile terminal of claim 1, further comprising:
    a position receiving unit to receive position information indicating a position of the mobile terminal,
    wherein the controller to translate the translation-source information into the translation-target information in a language of a country where the mobile terminal is positioned.

16. The mobile terminal of claim 1, wherein the controller to additionally control the output of the translation-target information in an aural manner.

17. The mobile terminal of claim 5, wherein when the translation window is moved on the display unit, another portion of the displayed screen information, corresponding to the translation window, is translated, and
wherein the moved translation window displays translation-target information corresponding to the another portion of the screen information.

18. The mobile terminal of claim 7, wherein the touch input to move the translation window is a flicking touch input applied to the translation window at a predetermined speed.

19. The mobile terminal of claim 1, wherein the controller configured to perform the operation associated with the translation-source includes in response to the predetermined-type touch input applied to the translation-target information, the controller configured to access a web address associated with the translation source information.

20. A mobile terminal comprising:
a display to display screen information;
a translation function unit to translate translation-source information of the displayed screen information; and
a controller configured to:
display a translation window to overlap with the screen information;
determine the translation-source information based on a display region of the translation window;
translate, by using the translation function unit, the determined translation-source information into the translation-target information;
display, at the translation window, the translation-target information;
receive, at the displayed translation-target information, a touch input,
determine a portion of the translation-source information that corresponds to the translation-target information that is output to a region corresponding to the translation window to which the touch input is received; and
in response to the touch input at the displayed translation-target information, access a web address associated with the translation source information.

* * * * *